(12) United States Patent
Chubanov

(10) Patent No.: US 12,166,631 B2
(45) Date of Patent: Dec. 10, 2024

(54) CONFIGURING A COMMUNICATION NETWORK

(71) Applicant: Robert Bosch GmbH, Stuttgart (DE)

(72) Inventor: Sergei Chubanov, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/311,731

(22) Filed: May 3, 2023

(65) Prior Publication Data
US 2023/0379215 A1 Nov. 23, 2023

(30) Foreign Application Priority Data

May 23, 2022 (EP) ..................................... 22174916

(51) Int. Cl.
*H04L 41/0823* (2022.01)
*H04L 41/16* (2022.01)

(52) U.S. Cl.
CPC .......... *H04L 41/0823* (2013.01); *H04L 41/16* (2013.01)

(58) Field of Classification Search
CPC ..... H04L 5/0053; H04L 47/10; H04L 5/0048; H04L 1/0026; H04L 47/50; H04L 1/0003;
(Continued)

(56) References Cited

U.S. PATENT DOCUMENTS 11,372,629 B1 * 6/2022 Meister .................... G06N 3/08
2017/0055276 A1 * 2/2017 Callard ................. H04W 72/12
(Continued)

FOREIGN PATENT DOCUMENTS

DE 102020213253 A1 4/2022
EP 3968576 A1 3/2022
EP 3979578 A1 4/2022

OTHER PUBLICATIONS

Durr et al., "No-Wait Packet Scheduling for IEEE Time-Sensitive Networks (TSN)," RTNS '16: Proceedings of the 24th International Conference on Real-Time Networks and Systems, 2016, pp. 1-10. <https://www2.informatik.uni-stuttgart.de/bibliothek/ftp/ncstrl.ustuttgart_fi/INPROC-2016-32/INPROC-2016-32.pdf> Downloaded May 3, 2023.

(Continued)

*Primary Examiner* — Djenane M Bayard
(74) *Attorney, Agent, or Firm* — NORTON ROSE FULBRIGHT US LLP; Gerard A. Messina

(57) ABSTRACT

A computer-implemented method of configuring a communication network. Devices of the network are configured to communicate according to scheduling parameters that indicate a timing of transmitting and/or receiving data over the communication network. To configure the network, the method uses a configuration procedure that is customizable by a set of customization parameters. For a current scheduling instance, representing multiple data streams to be scheduled, the configuration procedure is applied to determine current scheduling parameters, which are provided to the respective devices. Concurrently with the current customization parameters being used, the customization parameters are optimized with respect to a performance indicator of scheduling the current scheduling instance according to the customization parameters, with the updated customization being used to determine scheduling parameters for future scheduling instances with improved performance with respect to the performance indicator.

16 Claims, 7 Drawing Sheets

(58) Field of Classification Search
CPC ..... H04L 5/0035; H04L 47/24; H04L 5/0007; H04L 47/805; H04L 5/0094; H04L 5/0057; H04L 65/80; H04L 67/62; H04L 1/1812; H04L 5/0051; H04L 5/0055; H04L 47/2441; H04L 5/0044; H04L 41/12; H04L 47/2416; H04L 47/28; H04L 5/0037; H04L 5/0091; H04L 1/1887; H04L 12/2801; H04L 45/02; H04L 67/12; H04L 2012/5679; H04L 1/0009; H04L 1/0027; H04L 5/0073; H04L 1/1861; H04L 5/001; H04L 41/5003; H04L 41/5019; H04L 47/56; H04L 47/6215; H04L 47/623; H04L 5/0023; H04L 41/0894; H04L 5/006; H04L 41/082; H04L 43/0829; H04L 43/0852; H04L 5/0046; H04L 1/1822; H04L 1/1854; H04L 1/1896; H04L 12/4641; H04L 27/2602; H04L 27/261; H04L 67/306; H04L 41/0803; H04L 12/14; H04L 12/6418; H04L 2012/6421; H04L 41/5029; H04L 41/5067; H04L 67/1068; H04L 2209/56; H04L 63/107; H04L 9/088; H04L 51/18; H04L 41/0213; H04L 43/06; H04L 43/08; H04L 43/20; H04L 67/55; H04L 12/4633; H04L 41/046; H04L 41/0681; H04L 41/5048; H04L 41/509; H04L 43/00; H04L 43/0823; H04L 43/087; H04L 51/02; H04L 51/063; H04L 51/10; H04L 67/04; H04L 67/34; H04L 67/53; H04L 67/568; H04L 67/63; H04L 12/1813; H04L 12/1818; H04L 41/0823; H04L 51/52; H04L 67/131; H04L 67/52; H04L 67/535; H04L 69/162; H04L 1/0015; H04L 1/0029; H04L 2012/5626; H04L 2012/563; H04L 25/0224; H04L 25/0254; H04L 41/0654; H04L 41/0806; H04L 41/0816; H04L 41/083; H04L 41/142; H04L 41/145; H04L 41/147; H04L 41/16; H04L 41/40; H04L 41/5025; H04L 43/024; H04L 43/0835; H04L 43/12; H04L 47/283; H04L 49/104; H04L 63/168; H04L 67/5651; H04W 72/23; H04W 72/12; H04W 52/0219; H04W 52/0212; H04W 74/0808; H04W 28/0221; H04W 52/0229; H04W 52/0261; H04W 52/241; H04W 52/243; H04W 52/262; H04W 52/265; H04W 72/121; H04W 74/006; H04W 52/0209; H04W 72/0446; H04W 72/21; H04W 74/004; H04W 74/02; H04W 74/04

See application file for complete search history.

(56) References Cited

U.S. PATENT DOCUMENTS

| | | | |
|---|---|---|---|
| 2017/0180214 A1* | 6/2017 | Azevedo | ............... H04L 43/045 |
| 2021/0306910 A1 | 9/2021 | Guo et al. | |
| 2022/0021625 A1 | 1/2022 | Tang et al. | |
| 2022/0104213 A1* | 3/2022 | Song | ................... H04W 72/121 |
| 2023/0188233 A1* | 6/2023 | Gupta Hyde | ............ G06N 3/02 |
| | | | 370/329 |
| 2023/0229993 A1* | 7/2023 | Yang | ................ G06Q 10/06312 |
| | | | 705/7.16 |

OTHER PUBLICATIONS

Craciunas, et al.: "Scheduling Real-Time Communication in IEEE 802.IQbv Time Sensitive Networks," Real-Time Networks and Systems, ACM, New York, USA, (2016), pp. 183-192, XP058300427.

* cited by examiner

CONFIGURING A COMMUNICATION NETWORK

CROSS REFERENCE

The present application claims the benefit under under 35 U.S.C. § 119 of European Patent Application No. EP 22 17 4916.1 filed on May 23, 2022, which is expressly incorporated herein by reference in its entirety.

FIELD

The present invention relates to a computer-implemented method of configuring a communication network, and to a corresponding system. The present invention further relates to a computer-readable medium.

BACKGROUND INFORMATION

In modern communication networks, it is possible to automatically configure the network by adapting the scheduling parameters that the respective devices of the network use to communicate to each other. This is for example the case in time-sensitive networking (TSN), which is a set of IEEE standards that that provide mechanisms for time-sensitive transmission of data over communication networks, in particular ethernet networks as defined for example by the IEEE 802.1 and IEE 802.3 standards. In time-sensitive networking, gate control lists can be used to configure which data streams are transmitted by a device at which points in time. Thereby, it can be guaranteed that network traffic has a predetermined and guaranteed end-to-end latency. Such latency guarantees are important for example for communication networks used in industrial control systems such as in manufacturing plants.

In particular, scheduling parameters for devices of a communication network can be determined centrally and distributed among the devices. It is conventional in time-sensitive networking to determine the scheduling parameters using optimization techniques, thereby allowing to adapt the scheduling parameters to the situation at hand. For example, in the paper "No-wait Packet Scheduling for IEEE Time-sensitive Networks (TSN)" by F. Dürr et al., proceedings RTNS 2016 (incorporated herein by reference), scheduling in time-sensitive networks is modelled and then mapped to a particular type of scheduling problem from operational research. This scheduling problem is then solved by a Tabu search algorithm.

SUMMARY

It would be desirable to automatically configure a communication network in such a way that the configuration can be adapted more quickly based on changes in the situation at hand.

In accordance with a first aspect of the present invention, a computer-implemented method and a corresponding system are provided for configuring a communication network. In accordance with a further aspect of the present invention, a computer-readable medium is provided.

Various measures of the present invention relate to the configuration of a communication network. The communication network may comprise one or more end devices that may be configured to transmit data to each other, e.g., one or more controllers and one or more manufacturing robots of a manufacturing plant. The communication network may further comprise one or more network devices to facilitate the data transmission between the end devices, such a hub, a switch, a bridge, or another type of link device for routing traffic between other devices (where, in some cases, a network device may also act as an end device).

According to an example embodiment of the present invention, one or more of the end and/or network devices of the communication network may be configurable according to respective scheduling parameters. The scheduling parameters of a device may indicate a timing of transmitting and/or receiving data by that device. For example, the scheduling parameters may comprise one or more gate control lists for use in time-sensitive networking. As is conventional, such a gate control list may indicate that certain network traffic may be transmitted or received by a device during a certain time interval. The configuration of the communication network may refer to determining these scheduling parameters according to a configuration procedure, and optionally providing the scheduling parameters to the respective configurable devices to enable the devices to communicate according to the parameters.

Interestingly, the communication network may be automatically configurable in the sense that the scheduling parameters may be determined automatically based on a current scheduling instance. Accordingly, while the communication network is in use, its configuration may be updated based on the situation at hand. The current scheduling instance may represent multiple data streams to be scheduled. A data stream may represent an amount of data to be transmitted, via one or more network devices, from a first end device to a second end device. For example, for a given data stream, the scheduling instance may indicate a maximum amount of data, and/or one or more respective network devices via which the data stream is to be transmitted.

The scheduling instance may be for a fixed-size time window, e.g., of 1 millisecond, and may accordingly result in scheduling parameters for a periodic schedule corresponding to that time window. The devices may use the scheduling parameters to schedule the respective data streams, thus allowing to meet predefined transmission guarantees, e.g., in terms of latency. The device may also transmit unscheduled data that does not correspond to the data streams of the scheduling instance, e.g., using spare capacity in the schedule; for this data, no latency guarantees are typically provided.

Interestingly, the inventors envisaged to use a configuration procedure that is itself customizable by a set of configuration parameters. According to an example embodiment of the present invention, upon obtaining a current scheduling instance, the configuration procedure may determine current scheduling parameters for the current scheduling instance, according to current values for the configuration parameters; and provide these scheduling parameters to the respective configurable device for use in the communication network. In addition, however, the current scheduling instance may be used to optimize and update the customization parameters.

In particular, the customization parameters may be optimized with respect to a performance indicator of scheduling the current scheduling instance, and typically also one or more previously obtained scheduling instances, according to the customization parameters. The performance indicator can for example be based on latency (e.g., a maximum or average latency) and/or packet loss. The optimized customization parameters may be used to determine scheduling parameters for one or more later-obtained scheduling instances, but can also be used to determine further scheduling parameters for the current scheduling instance which, at least if these further scheduling parameters improve the current scheduling parameters, may be provided to the respective devices to update their configuration for the current scheduling instance.

By using a customizable configuration procedure that is customized by an optimization, the configuration of the communication network can be adapted quickly based on the situation at hand, while still allowing a highly performant configuration. In particular, existing optimization-based approaches may perform an optimization of the scheduling parameters itself for the current scheduling instance at hand. Such an optimization may take a long time to arrive at a good a solution, and during this time, the network cannot adapt to the current scheduling instance yet. Moreover, the optimization may not use knowledge of what schedules work well for observed scheduling instances to perform a faster and/or better optimization. By using the provided techniques, however, it is sufficient to apply the configuration procedure based on current customization parameters to obtain current scheduling parameters. Applying the configuration procedure may be faster, e.g., by a factor of at least 10 or 100, than optimizing the customization parameters. This way, it is possible to react much faster when a new schedule is needed. Still, the customization parameters are optimized, so as to improve the efficiency of the configuration procedure on average for the observed data.

In other words, instead of using an optimization to find an individual configuration of the communication network, the techniques provided herein may effectively construct a procedure (namely, the configuration procedure customized according to the customization parameters) of a given class of configuration procedures most suitable for the observed data. The configuration procedure may be a heuristic procedure in the sense that it does not itself perform an explicit optimization with respect to the performance indicator. The approach may be data-driven in the sense that this heuristic configuration procedure may be customized based on available data.

In particular, various existing techniques, in particular for configuring networks based on optimization, have the disadvantage that they do not work well in networks that have significant fluctuations of network characteristics like transmission rates. Namely, determined configurations can be sensitive to changes in the timing, so that reconfiguration may be beneficial when changes are too big, which however is computational to compute using existing techniques. On the other hand, existing techniques based on heuristics may not be able to improve the heuristics based on observed data. Interestingly, the provided techniques allow to adapt flexibly and efficiently to changes in the network, namely, by providing a fast reaction mechanism and a more time-consuming adaptation algorithm for the case of more substantial changes.

Typically, the communication network is a wired network, e.g., a wired ethernet network. In settings where transmission guarantees are needed, such as industrial control networks, wired networks are typically used because they are more stable and reliable than wireless networks. For example, the communication network may be an IEEE 802.1 compliant communication network. In particular, the communication network may use time-sensitive networking, e.g., as defined by the IEEE 802.1Q standard. The scheduling parameters may thus be parameters for time-sensitive networking, e.g., one or more gate control lists, as also discussed elsewhere in this specification.

In particular, according to an example embodiment of the present invention, a data stream to be scheduled may represent control data to be transmitted from a controller to a computer-controlled system, and/or from the system to the controller. For example, the computer-controlled system may be a robot, a vehicle, a domestic appliance, a power tool, a manufacturing machine, a personal assistant, or an access control system. In the setting of automated control, it is particularly important to have real-time guarantees about the transmission of information, so the provided techniques are particularly beneficial in this setting.

Optionally, according to an example embodiment of the present invention, applying the configuration procedure may comprise applying a job scheduling algorithm to obtain a schedule for respective data transmissions corresponding to the multiple data streams. The scheduling parameters may be derived from this obtained schedule, for example, such that use of the scheduling parameters results in communication according to the obtained schedule. As is conventional, scheduling algorithms are available that are able to efficiently determine a schedule, e.g., list scheduling or priority scheduling. Moreover, the behaviour of such scheduling algorithms is typically customizable by customization parameters, e.g., indicating a priority function and/or an ordering in which jobs are scheduled. This makes job scheduling a good choice for the configuration procedure.

Optionally, according to an example embodiment of the present invention, the job scheduler may be applied by scheduling a data transmission from a first device to a current second device; and selecting a next second device for data transmission from the first device according to an ordering defined by the customization parameters. In other words, for a given node A, the customization parameters may define an ordering following which a next neighbouring node B is chosen to receive a next data transmission to be processed. In this way, the behaviour of the job scheduler may be configured in a relatively efficient way, e.g., using relatively few parameters.

Optionally, according to an example embodiment of the present invention, further to selecting a next second device, a data transmission may be queued from the current second device to a next device on a route indicated by the corresponding data stream. For example, per receiving device, a queue of data transmissions to be received by that device may be maintained. Accordingly, the data transmission may be added to the queue for the next device. This way, respective data transmissions of a data stream may be progressively scheduled.

Optionally, according to an example embodiment of the present invention, the customization parameters may be optimized by empirical risk optimization over one or more scheduling instances, e.g., over the current scheduling instance and/or one or more previously obtained scheduling instances. In other words, the finding of optimal customization parameters may be performed by finding optimal customization parameters for a suitable sample of scheduling instances, which is efficient but, for a suitably selected sample, still provides good results.

Optionally, according to an example embodiment of the present invention, the customization parameters may be binary values. This is a convenient choice to represent parameters by which a configuration procedure may be customized, as illustrated by the examples provided herein. However, regular optimization procedures such as Bayesian optimization may not work well to optimize binary customization parameters: both because these parameters are discrete, and because the number of customization parameters may be too large to use to use such procedures effectively, e.g., the number of parameters may be at least 100, at least 1000, or at least 10000. Interestingly, however, the customization parameters may be optimized by a pseudo-Boolean optimization. Such an optimization may be heuristic and/or arrive at a local optimum, but can be implemented relatively efficiently.

In particular, according to an example embodiment of the present invention, the optimization may be performed by iteratively training and applying a classifier. Namely, a scoring function may be trained to score candidate sets of customization parameters according to the performance indicator, and a further set of customization parameters may be determined by optimizing with respect to the trained scoring function. In particular, the proposed black-box optimization algorithm may learn necessary optimality conditions following from evaluations of observed solutions, and attempt to improve the currently best solution by generating new solutions satisfying the constructed conditions, represented, e.g., in the form of a system of linear inequalities.

Optionally, according to an example embodiment of the present invention, the current scheduling parameters may be determined by accessing multiple respective sets of customization parameters; determining respective scheduling parameters according to the respective sets of customization parameters; and selecting the current scheduling parameters from the respective scheduling parameters based on the performance indicator for the current scheduling instance. Thus, multiple sets of customization parameters may be kept and the best resulting schedule may be used. For example, parameter sets may be kept or removed based on age and/or performance on current scheduling instances. Interestingly, despite applying the configuration procedure multiple times and/or scoring schedules according to the performance indicator, still, scheduling parameters may be determined sufficiently quickly. It is also possible for example to initially base the current scheduling parameters on one or a subset of sets of customization parameters, and distribute the resulting scheduling parameters; and to subsequently refine the scheduling parameters and distribute them if an improvement is found.

Optionally, according to an example embodiment of the present invention, a change point detection procedure may be used to detect a change point of scheduling instances, The detected change point may be used to select scheduling instances to be used for the optimization. For example, only scheduling instances after the detected change point may be used for the optimization. The change point detection may detect a change that may necessitate a change in network configuration. By selecting scheduling instances according to the detected change point, it may be avoided that scheduling instances from before the change point, that are less relevant, have an undue influence on the network configuration. The optimization may also be used to trigger the optimization, in other words, the optimization may be performed in response to a detected change point. This also allows to more quickly respond to changes in the network configuration while avoiding to apply the optimization unnecessarily.

Interestingly, by using a change point detection instead of for example updating the configuration based on a change in measured performance according to the performance indicator, the configuration can be updated in a wider range of situations. For example, a change in network configuration may not necessarily decrease the performance indicator according to the current scheduling parameters, but may still allow scheduling parameters to be determined that improve performance. By using change point detection, the scheduling parameters can be updated quickly also in such cases.

Optionally, according to an example embodiment of the present invention, applying the change point detection procedure may comprise training a classifier to distinguish between performance indicators of scheduling instances before and after the change point, and evaluating a performance of the trained classifier. Sufficient performance of the classifier for a candidate point may indicate that the scheduling instances split well between before and after the candidate point, and thus that the candidate point may indeed by a change point. For example, accuracy of the classifier may be compared against a threshold. Interestingly, the used classifier may be a polyhedral classifier. This classifier combines a sufficiently small running time and a sufficiently good prediction accuracy, making it particularly suitable for the present real-time application.

Optionally, according to an example embodiment of the present invention, the scheduling parameters may represent a gate control list and/or data transmission timings for time-sensitive networking. A gate control list may indicate data allowed to be transmitted in a particular time slot. Data transmission timings may indicate a start and/or end time of a time slot, for example, in a periodic interval being scheduled. By configuring these aspects of time-sensitive networking, data streams within the network may be set up such that they can be transmitted in a reliable way.

Generally, the configuration of the communication network herein may be performed by a configuration system, examples of which are provided herein. In particular, the techniques provided herein may be for time-sensitive networking, e.g., according to the IEEE 802.1Q standard. The configuration system may be a central network controller of the communication network.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the example embodiments described by way of example in the following description and with reference to the figures.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
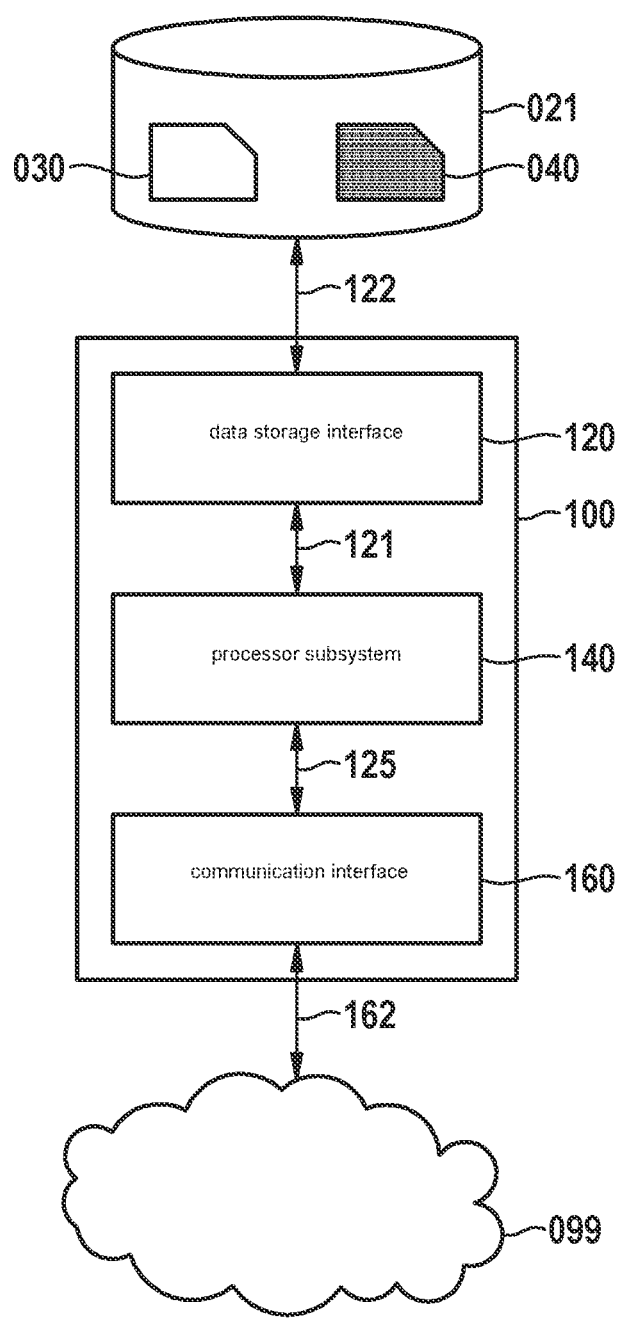
FIG. 1 shows a configuration system for configuring a communication network, according to an example embodiment of the present invention.
Figure 2:
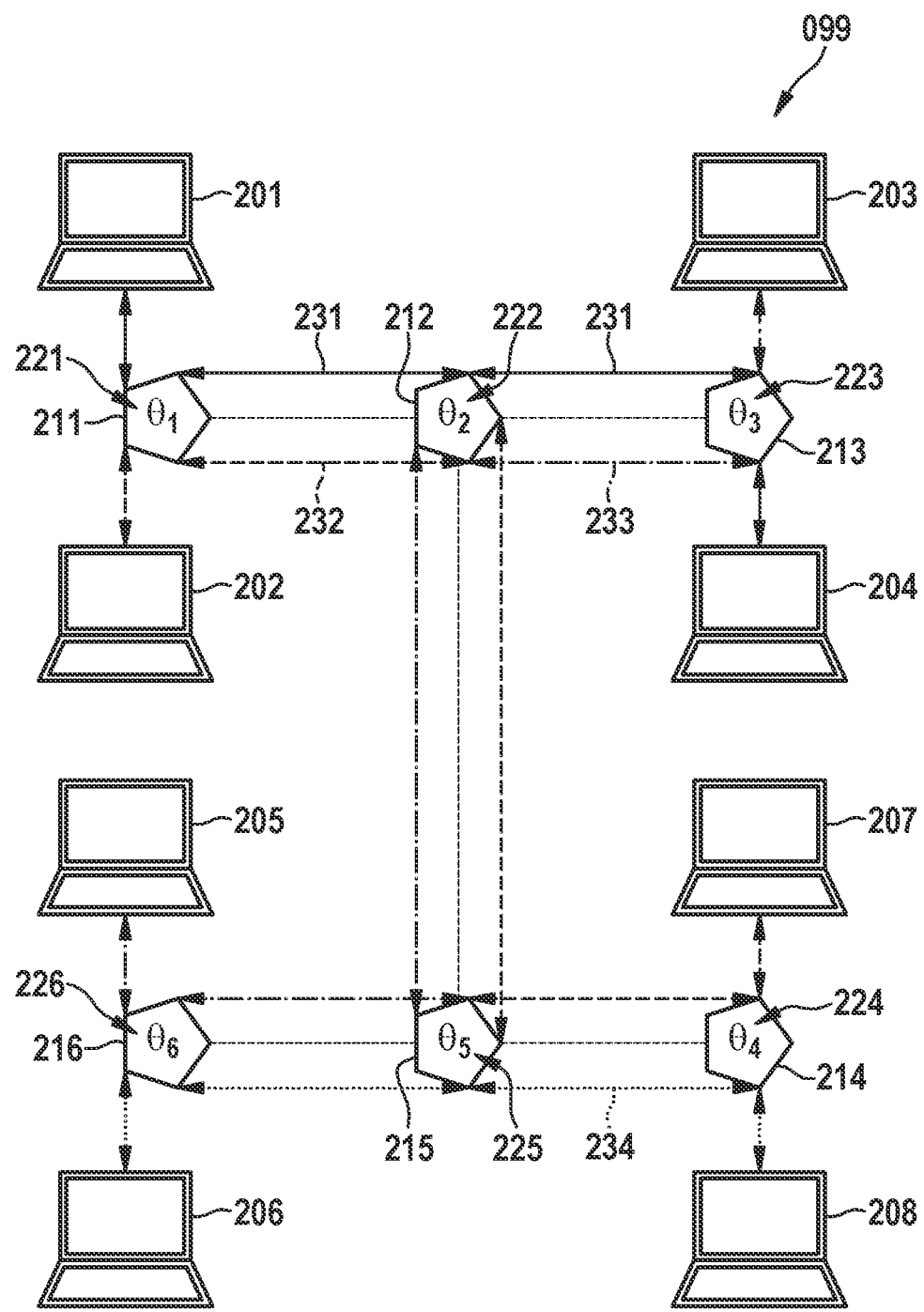
FIG. 2 shows a detailed example of a communication network, according to the present invention.

FIG. 1 shows a configuration system 100. System 100 may be for configuring a communication network 099, e.g., as shown in FIG. 2. The communication network 099 may comprise multiple configurable devices (not shown in this figure). The respective devices may be configured to communicate according to respective scheduling parameters. The scheduling parameters may indicate a timing of transmitting and/or receiving data over the communication network. The system 100 itself may be one of the configurable devices. System 100 may be a central network controller (CNC) or a centralized user configuration (CUC) device of the communication network 099.

The system 100 may comprise a data interface for accessing data representing a set of customization parameters 030 of a configuration procedure. The configuration procedure may be configured to determine the scheduling parameters of the multiple configurable devices for a scheduling instance. The scheduling instance may represent multiple data streams to be scheduled. The number of customization parameters 030 may for example be at least 100, at least 1000, or at least 10000. The data interface may instead or in addition be for accessing a current scheduling instance 040.

For example, as also illustrated in FIG. 1, the input interface may be constituted by a data storage interface 120 which may access the data 030 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, respective data 030, 040 may each be accessed from a different data storage, e.g., via a different subsystem of data storage interface 120. Each subsystem may be of a type as is described above for the data storage interface 120.

The system 100 may further comprise a processor subsystem 140 which may be configured to, during operation of the system 100, obtain the current scheduling instance 040. The processor subsystem 140 may be further configured to apply the configuration procedure, using the customization parameters 030, to the current scheduling instance 040, to determine current scheduling parameters of the multiple configurable devices. The processor subsystem 140 may be further configured to provide the current scheduling parameters to the respective devices. The processor subsystem 140 may be further configured to, based on the current scheduling instance 040, optimize the customization parameters 030 of the configuration procedure with respect to a performance indicator of scheduling the current scheduling instance according to the customization parameters.

The system 100 may also comprise a communication interface 160 configured for communication 162, e.g., to provide the current scheduling parameters to the respective configurable devices of the communication network. Communication interface 160 may internally communicate with processor subsystem 140 via data communication 125. As illustrated in the figure, communication interface 160 may be arranged for communication over the communication network 099 that is being configured. However, this is not needed in principle in that the scheduling parameters can also be transmitted to the configurable devices externally from the communication network 099. Communication interface 160 may for example be arranged for direct communication with the configurable devices, e.g., using USB, IEEE 1394, or similar interfaces. Communication interface 160 may communicate over a computer network, for example, a wireless personal area network, an internet, an intranet, a LAN, a WLAN, etc. For instance, communication interface 160 may comprise a connector, e.g., a wireless connector, an Ethernet connector, a Wi-Fi, 4G or 4G antenna, a ZigBee chip, etc., as appropriate for the computer network. Communication interface 160 may also be an internal communication interface, e.g., a bus, an API, a storage interface, etc. Generally, the communication network 099 being configured may be a telecommunication network; typically it is a wired network such as an ethernet network. For example, communication network 099 may be an IEEE 802.1 compliant network, in particular a network using IEE 802.1Q time-sensitive networking.

In general, each system described in this specification, including but not limited to the system 100 of FIG. 1, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit.

The respective system may also be implemented in a distributed manner, e.g., involving different devices or apparatuses, such as distributed local or cloud-based servers. In particular, the application of the configuration procedure and the optimisation of the customization parameters may be carried out by different respective devices.

System 100 may be part of a control system further comprising a controller and one or more computer-controlled systems, such as one or more robots, or the like. For example, the control system may be an industrial control system. In this setting, a data stream may represent control data to be transmitted from a controller to a robot or other computer-controlled system and/or state data to be transmitted from the robot or other computer-controlled system to the controller.

FIG. 2 shows a detailed, yet non-limiting, example of a communication network 099 to be configured, for example, a telecommunication network. Communication network 099 may be an ethernet network and/or an IEEE 802.1 communication network.

Communication network 099 may comprise multiple devices. For example, the number of devices may be at least 10, at least 20, or at least 100. The devices may also be referred to herein as "nodes" of the communication network. As an illustrative example, the figure shows six devices 211-216. Generally, a device may be an end device and/or a network device.

An end device may be a device that uses the communication network 099 to send data to one or more other end devices. The device may nor may not be directly connected to the other device; in the latter case, the traffic from the device to the other device may be routed via one or more further devices. In particular, an end device may run one or more applications. An application may schedule communication with one or more other applications running on one or more other devices of the communication network. For example, a controlling application may run at a controller to remotely control a robot, and a corresponding controlling application may run at the robot to receive and execute control commands and/or send state information to the controlling application. In this example, a reliable transmission with small transmission times in both directions and small numbers of lost packets is important for a successful accomplishment of the tasks assigned to the robot.

A network device may be a device via which traffic between the end devices of the network may be transmitted, such as a hub, switch, router, bridge, gateway, modem, repeater, or other type of link device. It is also possible to consider respective ports of a link device, e.g., a switch, as being respective devices of the communication network, e.g., when using a graph-based representation of the communication network as described herein, respective nodes may represent respective ports of a link device. Also, if necessary, a node can represent a link of a physical telecommunication system.

For example, the figure shows four end devices 211, 213, 214, and 216; and two network devices 212, 215. In this example, there are no devices that act both as end device and as network device, but this is possible in general. The figure does not specifically show the system for configuring the communication network as described herein; this system may be one of the end or network devices, or may be an additional device.

This example also shows eight applications communicating over the communication network 099. End device 211 in this example runs two applications 201, 202; end device 213 runs two applications 203, 204; end device 216 runs two applications 205, 206; and end device 214 runs applications 207, 208. It will be understood that, in general, the number of applications may vary per end device and may also vary in time.

The example also shows four data streams 231-234 between the applications that may be scheduled according to the techniques described herein. A data stream may comprise one or more data packets to be transmitted between two end devices, for example, a query from a first end device to a second end device, and a response from the second end device to the first end device. A package size may be 64 kB. For example, one, more, or all of the packets of a data stream may have packet size at least 32 kB, at least 64 kB, or at least 128 kB; and/or one, more or all of the packets of a data stream may have packet size at most 512 kB, at most 1 MB, or at most 4 MB. The data streams may be periodic, meaning that they are scheduled for periodic transmission with a certain period. Typically, the period may lie between 0.1 and 10 ms, for example between 0.5 and 5 ms, for example 1 ms.

As also described elsewhere, a data stream between end devices may follow a predefined route between the first and second end devices via zero, one, or more network devices. For example, the figure shows a data stream 231 between application 201 of end device 211 and application 204 of end device 213, via network device 212. The figure further shows a data stream 232 between application 202 of end device 211 and application 207 of end device 214, via network devices 212 and 215. Also shown is a data stream 233 between application 203 of end device 213 and application 205 of end device 216, via network devices 212 and 215. Finally, the figure shows a data stream 234 between application 206 of end device 216 and application 208 of end device 214, via network device 215.

The figure also illustrates how various devices of the communication network 099 may be configurable through respective scheduling parameters for the respective devices. For example, the number of configurable devices may be at least 10, at least 20, or at least 100. In this example, devices 211-216 are configurable through respective scheduling parameters $\theta_i$, 221-226, also referred to as "node configurations". The scheduling parameters may indicate a timing of transmitting and/or receiving data over the communication network 099. A device may be configured to communicate according to the scheduling parameters by following what may be referred to as "dispatching rules". The scheduling parameters may define a certain way in data streams are processed within a time interval. The dispatching rules of the network device may provide a mechanism to process the data packets according to the scheduling parameters. Generally, the selection of scheduling parameters influences performance indicators of the communication over the communication network 099, such as average transmission time (average latency) of a packet. Moreover, in many time-sensitive applications, packets are available for processing only within a certain lifetime, meaning that the packet may be considered lost if the lifetime is exceeded. The number of packets that is lost in this sense is another performance indicator affected by the scheduling parameters.

For instance, the scheduling parameters of a device may define a gate control list and/or data transmission timings for time-sensitive networking (TSN), e.g., according to standard 802.1Qbv. TSN may allow to configure devices of the communication network by specifying gate control lists which describe which gates and within what time intervals are be open, where a gate is related to a queue containing data packets to be transmitted to their destinations.

Scheduling parameters 221-226 may be provided to the respective devices by a device for configuring the communication network as described herein. Interestingly, the scheduling parameters 221-226 may be updated while the network is up and running, allowing to dynamically update the configuration of the network 099. By changing the network configuration, better performance of the network may be achieved with respect to the current scheduling instance, e.g., collection of the data streams to be transmitted. If the current instance changes to another one, for instance, a user starts a new application that communicates with another application on the network, another configuration may be chosen that is more suitable for the new instance.

In the example shown, each of the devices is configurable through scheduling parameters, but this is not needed. For example, in some cases, only the network devices, or only a subset of the network devices and/or end devices, may be configurable. In this cases, it is still possible to configure the network appropriately, e.g., the network 099 may include repeaters, switches, hubs, or the like that do not need to configured but that, in combination with configurable devices, still allow network communication to take place according to a schedule.

The data streams 231-234 shown in the figure may represent scheduled traffic. Such scheduled traffic may be comprised in the scheduling instance from which the scheduling parameters 221-226 are derived, as also discussed elsewhere. Apart from this scheduled traffic, communication network 099 may also be used for unscheduled traffic. For example, the unscheduled traffic may use network capacity not used for any scheduled traffic, for example, one or more time slots of time-sensitive networking that are not reserved for scheduled traffic. Accordingly, communication network 099 may combine transmission guarantees for scheduled traffic with the ability to also transmit unscheduled traffic. For the unscheduled traffic, typically no transmission guarantees may be provided; e.g., such traffic may be transmitted on a best-effort basis.

Figure 3:
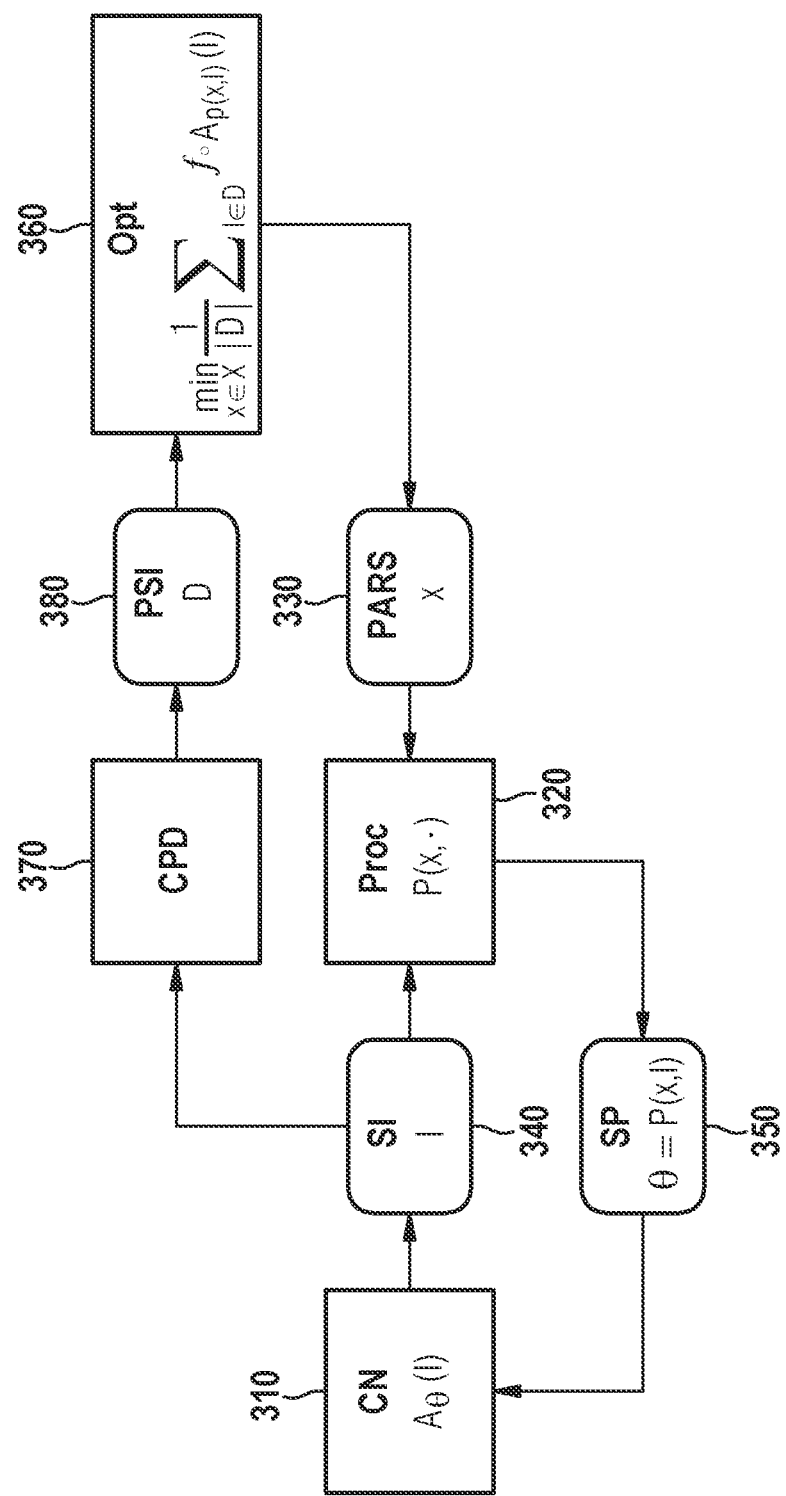
FIG. 3 shows a detailed example of how to configure a network, according to the present invention.

FIG. 3 shows a detailed, yet non-limiting, example of how to configure a communication network, for example, communication network 099 of FIG. 2*a*.

Shown in the figure is the communication network CN, 310. Generally, the communication network may comprise multiple configurable devices that are configured to communicate according to respective scheduling parameters SP, 350. The scheduling parameters SP may indicate a timing of transmitting and/or receiving data over the communication network CN. For example, the scheduling parameters SP may indicate respective time slots for respective data streams and/or transmissions within a time interval.

As illustrated in the figure, scheduling parameters SP may be determined for a current scheduling instance SI, 340, by a configuration procedure Proc, 320. For example, the current scheduling instance SI may be compiled by a configuration device based on requests by respective devices of the communication network to transmit or receive respective data, as is conventional, e.g. for time-sensitive networking. These scheduling parameters SP may then be provided to the configurable devices of the communication network for communicating according to the scheduling parameters.

The configuration procedure Proc typically gets, as an input, data representing the graph of the communication network being configured (although this information can in principle also be hardcoded), as illustrated with respect to FIG. 2. This data typically comprises at least a list of nodes of the communication network; this list of nodes can optionally be combined with network topology information indicating how the nodes are connected. As discussed, nodes typically represent devices of the communication network, but respective nodes can also represent respective ports of a single physical switch, or a node can represent a link of a telecommunication system, for example.

The scheduling instance SI that is input to the configuration procedure, may represent one or more data streams to be scheduled, for example, at least two, at least four, or at least ten. A data stream s between two applications at two respective end devices may be represented as a sequence $(J_j^s)$ of one or more so-called jobs $J_j^s$. A job may represent an individual data packet to be transmitted from one of the end devices to the other. For a data stream, the scheduling instance may indicate a number of packets to be transmitted, e.g., a maximum number of packets. Further, respective packet sizes may be indicated. It is also possible to indicate respective time intervals within which packets are to be transmitted.

Typically, the scheduling instance SI may, for a given data stream, indicate a route of network devices to be followed between the end devices. However, it is also possible in principle for respective data packets of the streams to follow respective routes, and/or to optimize the routing as part of the scheduling.

Scheduling instance SI may also indicate a set of constraints that are to be satisfied by schedule according to which the data streams are communicated.

In particular, scheduling instance SI may indicate precedence constraints, for example to indicate that a packet is to be sent in response to another data packet (of the same or of a different data stream). In the latter case, for example, a response packet is to be sent at least a given amount of response time later than the receipt of a packet that it is a response to. The scheduling instance SI may also indicate a constraint on availability of a device, for example, as one or more time intervals during which the device is available to perform communication. For example, in a first scheduling step, higher-priority traffic may be scheduled, leading to time intervals in which the higher-priority traffic is scheduled; and in a second scheduling step, lower-priority traffic may be scheduled during the time intervals during which no higher-priority traffic is scheduled.

Further constraints are possible. For example, one or more constraints can model the functionality of the respective devices of the network, e.g., of the network devices via which the data is transmitted. For instance, scheduling instance SI may include a constraint indicating that only one packet can be transmitted at one same time in a particular direction over a given communication link, when appropriate.

Given the scheduling instance SI, the configuration procedure Proc may apply a job scheduling algorithm to obtain a schedule for respective jobs, with the jobs corresponding to data transmissions of the multiple data streams. Indeed, the scheduling of data transmissions may be considered as a job-shop scheduling problem, where the objective is, given a collection of machines, to schedule the jobs such that respective machines process no more than one job at the same time. Respective machines may have respective speeds which corresponds to available bandwidth, e.g., expressed in bits per second. The processing time of a job on a machine may be determined as the size of the respective data packet divided by the speed of the machine. The scheduling parameters SP may be derived from the schedule, e.g., by setting the parameters such that performing the communication according to the scheduling parameters leads, at least approximately, to the determined schedule. By using job scheduling, e.g., using a heuristic job scheduling algorithm, scheduling parameters can be determined relatively quickly.

Interestingly, the configuration procedure Proc may be customizable by means of a set of customization parameters PARS, 330. For example, when using a scheduling algorithm, the customization parameters may provide, for a given first device, an ordering of second devices to which data is transmitted. This way, different customization parameters may lead to data transmissions happening in a different order. Detailed examples of this are given with respect to FIGS. 4A and 4B.

More generally, let $\Theta$ denote a set of valid scheduling parameters for the respective devices of the communication network, e.g., a set of feasible configurations. The configuration procedure Proc may be formalized as a function, in other words, procedure $$P: X \times \mathcal{J} \to \Theta.$$

Here, $\mathcal{X}$ is the set of possible sets of customization parameters PARS for the configuration procedure Proc. E.g., the customization parameters may be binary values, in which case $\mathcal{X} \subseteq \{0,1\}^n$. $\mathcal{J}$ is the set of possible scheduling instances of the communication network. The configuration procedure may output a feasible configuration $\theta = (\theta_1, \ldots, \theta_n) \in \Theta$ with $\theta_i$ the scheduling parameters of device i.

In principle, various configuration procedures Proc can be used with the provided techniques. Examples are discussed with respect to FIG. 4B. Generally, it is preferred if the configuration procedure Proc is computationally efficient, e.g., if it does not comprise optimization techniques such as a Tabu search to arrive at the scheduling parameters SP. This way, procedure P can deliver a configuration $\theta$ of the network for a given $x \in \mathcal{X}$ and a given instance $I \in \mathcal{J}$ within a limited time. Another desideratum refers to the quality of solutions returned by P. Preferably, P is selected such that it can produce a relatively broad set of configurations $\theta$. P may be such that for each $I \in \mathcal{J}$ there is an optimal configuration $\theta$ of the network that can be reproduced by means of P by choosing a suitable $x \in \mathcal{X}$. However, this is not needed. It is also possible to obtain good results by choosing a procedure P and set of customization parameters $\mathcal{X}$ that are able to reproduce a large part of reasonably good configurations $\theta$.

Interestingly, the customization parameters PARS may be determined by performing an optimization Opt, 360, with respect to a performance indicator of scheduling a set of one or more previously obtained scheduling instances PSI, 380 according to the customization parameters. For example, the previously obtained scheduling instances PSI may comprise the most recent scheduling instance SI to which the scheduling procedure was applied, and a number of preceding scheduling instances; or a selection of these scheduling instances. This is also discussed in more detail elsewhere in this specification.

Generally, the performance indicator may be denoted by a function $f$. The performance indicator may relate to an individual data packet, to a stream, to the entire data, or to any desired performance measure. In particular, the performance indicator may be based on a latency and/or a packet loss, for example, the performance indicator may be based on a maximum and/or average latency.

Generally, the performance indicator may be evaluated for a given scheduling instance SI by performing a simulation of the communication in the communication network CN performed according to the scheduling parameters SP determined by the configuration procedure Proc for that instance. Mathematically, the communication network CN may be modelled by a function $A_\theta$. With an input scheduling instance I comprising data streams, and given information about the network such at its topology, the function $A_\theta$ may be configured to provide an output $A_\theta(I)$ containing the information (e.g., times at which data packets arrive at destinations) needed to compute the performance indicator. For example, simulations by a so-called "digital twin" of the communication network can be used as is conventional. Interestingly, optimization Opt may use the model $A_\theta$ of the communication network as a black box. Accordingly, the optimization Opt per se may be implemented independently of the concrete notion of scheduling parameters used, and may thus be applicable to a wide range of current and future standards for configuring communication networks. Accordingly, given performance indicator $f$, then $f \circ A_\theta(I)$ may denote the performance indicator of scheduling instance I according to customization parameters $\theta$.

With the above notation, the optimization problem addressed by optimization procedure Opt may be phrased as follows. Finding an optimal x for an individual instance I may correspond to the optimization problem $$\min_{x \in \mathcal{X}} f \circ A_{P(x,I)}(I).$$

Accordingly, optimization procedure Opt may be configured to optimize the behaviour of the configuration procedure P in average, e.g.:

$$\min_{x \in \mathcal{X}} \mathbb{E}_{I \sim \mathcal{D}} (f \circ A_{P(x,I)}(I)).$$

where $\mathcal{D}$ is a distribution over scheduling instances.

In particular, optimization procedure Opt may be configured to optimize the customization parameters by performing an empirical risk optimization over one or more scheduling instances PSI.

This empirical risk minimization problem may correspond to taking a sample D from $\mathcal{D}$:

$$\min_{x \in \mathcal{X}} \frac{1}{|D|} \sum_{I \in D} f \circ A_{P(x,I)}(I).$$

Denoting the objective function by g, this problem may also be written as $$\min_{x \in \mathcal{X}} g(x).$$

Generally, various optimization approaches may be used for optimization procedure Opt. A detailed example is described with respect to FIG. 4C. It will be understood that the optimization may be heuristic and/or may arrive at a local optimum.

Configuration procedure Proc can be computationally efficient, making it possible to determine the scheduling parameters SP much more quickly than determining the customization parameters PARS, e.g., at least 10 times or at least 100 times as quick.

In some cases, upon obtaining a new scheduling instance $I \in \mathcal{J}$, a new configuration $\theta = P(x,I)$ may be determined according to the current customization parameters x, PARS, and directly provided to the respective devices. Interestingly, this allows to quickly reconfigure the network, since the reconfiguration does not have to wait until the outcome of optimization Opt. This enables reliable and efficient use of configurable network technologies such as time-sensitive networking. In particular, in TSN, the used gate control lists are sensitive to changes of the data streams, so it is beneficial to quickly reconfigure them when the data streams change. A computationally efficient configuration procedure Proc provides this possibility.

It is also possible to keep multiple sets of customization parameters PARS; apply the configuration procedure Proc according to the multiple sets of customization parameters; and make a selection among the resulting scheduling parameters. For example, the selection may be based on evaluating the performance of the resulting scheduling parameters as described herein. Because applying the configuration procedure multiple times and also evaluating the performance may take more time than just applying the configuration procedure once, this process may take place after the current customization parameters are provided to the respective devices, with parameters being updated if it is determined that they are non-optimal. It is also possible to wait with the reconfiguring of the respective devices until the procedure has been completed. For example, sets of customization parameters may be kept that are the most recent and/or that have led to the best-performing scheduling parameters for previous scheduling instances.

The optimization Opt based on the current scheduling instance SI may be performed in parallel with configuring the network, or after the network has been configured. The parameters PARS resulting from the optimization can, when determined, be applied to the most recent scheduling instance SI at that point (which may be the same most recent instance as when the optimization was initiated, or a most recent one). The resulting scheduling parameters SP may again be used to reconfigure the network, optionally after checking that the updated scheduling parameters improve the performance indicator for the current scheduling instance.

It is possible to initiate the optimization Opt whenever a new scheduling instance SI is obtained, e.g., when there is a change in the network topology and/or the data streams to be scheduled. In practice, in settings such as industrial control networks, the network configuration may be expected to change relatively infrequently, for example, on average, at most once every hour or every day. It is still advantageous to use the provided techniques since the use of computationally efficient configuration procedure Proc allows to adapt to new scheduling instances SI quickly. It is also possible to perform optimization Opt periodically, for example.

Interestingly, the scheduling instances PSI to which the optimization is applied, may be determined according to a change point detection procedure CPD, 370. The change point detection procedure CPD may be configured to detect changes in the scheduling parameters determined by the scheduling procedure, for example, with respect to one or more performance indicators. For example, a detected change point may be used to select only scheduling instances after the detected change point, or in any case, to favour scheduling instances after the detected change point to be used over scheduling instances before the detected change point. Instead of or in addition to using the change point detection CPD for this selection, a detected change point may also be used to trigger performing the optimization Opt. A suitable size of the time window of previous scheduling parameters for the change point detection CPD can for example be most or at least 20, at most or at least 40, or at most or at least 80. As a specific example, a change point detection CPD based on a polyhedral classifier may be used, as discussed in more detail with respect to FIG. 4D.

Figure 4A:
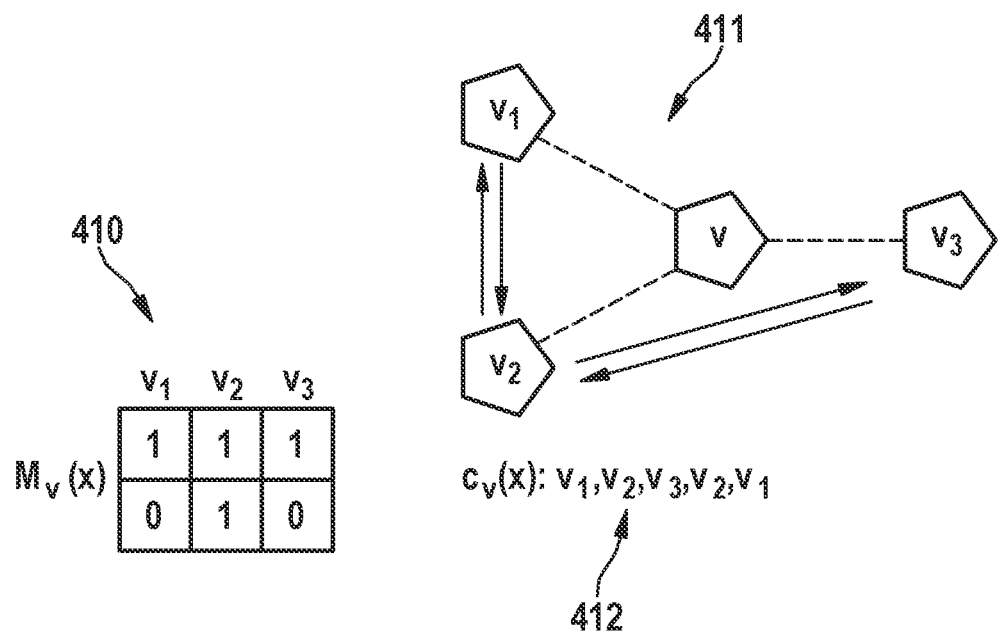
FIG. 4A shows a detailed example of customization parameters, according to the present invention.

FIG. 4A shows a detailed, yet non-limiting, example of customization parameters. This example shows a set of binary customization parameters 410 defining an ordering of devices of the communication network. This ordering may be used for example to parameterize a job scheduling algorithm as also discussed with respect to FIGS. 3 and 4B.

Generally, for respective first devices (nodes) of the communication network, the customization parameters may define an ordering of respective second devices (nodes) to which the first device is directly connected. Given customization parameters $x \in \mathcal{X}$, such an ordering may be defined by a cycle:

$$c_v(x) = (v_{i_1}, v_{i_2}, \ldots, v_{i_{k(x)}}, v_{i_1}).$$

The number of vertices k(x) can depend on the customization parameters x. It is allowed that $v_i = v_j$ for different i and j. The second devices traversed by the cycle may correspond to the devices incident to device v in the graph of the network.

For example, the figure illustrates a communication network 411 in which a first device v is directly connected to three second devices: $v_1$, $v_2$, and $v_3$. The figure further shows an example of how the set of customization parameters 410 can provide a binary encoding of the cycle for node v (but many alternatives are possible as well). In this example, let $m_v$ be a hyper-parameter associated with node v. Let $n_v$ be the number of nodes incident to v. The customization parameters may comprise a set of parameters $x_v$ defining the cycle $c_v(x)$, given as a $m_v \times n_v$ binary matrix $M_v(x)$. In this matrix, a column may contain at least one 1 such that all incident edges may be covered.

The cycle may be defined based on such a matrix as follows. Let the entries of $M_v(x)$ be enumerated row-wise, for example, from the left to the right and from the top to the bottom. According to this enumeration, a first non-zero matrix entry may be selected, and the corresponding node, in this case $v_1$, may be selected as the first element of the cycle. The next node may correspond to the column with the next 1-entry according to the enumeration, in this case, $v_2$. Continuing to enumerate the nonzero entries of $M_v(x)$, the cycle $c_v(x)$ may be obtained. The cycle 412 corresponding to this example (with $m_v=2$ and $n_v=3$) is shown in the figure.

It will be understood that many alternatives are possible, e.g., the matrix elements may be enumerated differently; the role of the 0 and 1 matrix entries may be swapped, etc. As these examples illustrate, discrete, and in particular binary, customization parameters are particularly convenient for customizing a configuration procedure because they are well suited to defining an ordering of devices. For example, the number of such parameters may be at least 100, at least 10000, or at least 100000. Still, it is possible to optimize such parameters relatively efficiently, as exemplified with respect to FIG. 4C.

Figure 4B:
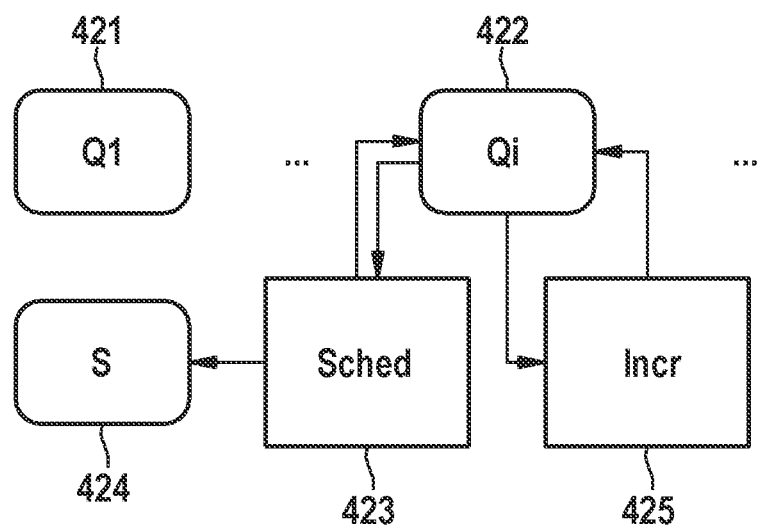
FIG. 4B shows a detailed example of determining scheduling parameters, according to the present invention.

FIG. 4B shows a detailed, yet non-limiting, example of determining scheduling parameters. In this example, a set of scheduling parameters is determined by applying a job scheduling algorithm Sched, 423. Given respective data transmissions corresponding to multiple data streams that are to be scheduled for transmission over the communication network, the job scheduling algorithm Sched may result in a schedule S, 424 for the data transmissions. The scheduling parameters can then be derived from the schedule by setting the scheduling parameters in such a way that data transmission according to the scheduling parameters results in the determined schedule S, for example, by setting gate control lists to correspond to the data transmissions.

In particular, the job scheduling algorithm Sched may operate in an iterative fashion. In an iteration, the scheduler Sched may schedule a data transmission from a first device to a current second device; and then select a next second device for data transmission from the first device. Interestingly, the next second device may be selected according to an ordering defined by the customization parameters. The ordering may define a sequence of other devices to which the first device is connected in the communication network, where the sequence may contain repetitions. Next devices may be selected by looping through the sequence. The sequence can for example be defined as shown in FIG. 4A, but any way of defining a sequence of connected devices is possible in principle.

In particular, for respective devices of the communication network, the scheduler Sched may maintain respective queues Q1, 421, . . . , Qi, 422. The queue for a device may comprise data transmissions to be received by that device. The scheduler Sched may select a first device, e.g., by sequentially looping through set of nodes; obtain the current second device to which to schedule a data transmission from that first device; and select from the queue Qi for the second device a first (e.g., with respect to arrival time at the second device) data transmission from the first to the second device. This data transmission may be scheduled according to a scheduling algorithm as is conventional, for example, list scheduling or another heuristic scheduler. The queues can also be associated to the sender node of a data transmission instead of to its recipient.

Following the scheduling, an increment operation Incr, 425, may select a next second device to which to schedule a data transmission from the first device, according to the ordering defined by the customization parameters. Further, the increment operation Incr may, if the second device is not the end device for the schedule data transmission, queue a data transmission from the current second device to a next device on route to that end device, e.g., by adding the data transmission to the queue for that next device.

As a detailed example, the configuration procedure $P(x, \cdot)$ may operate on a given scheduling instance $x \in \mathcal{X}$ as follows. Here, $c_v(x)$ refers to an ordering of second devices given a first device v, as defined by customization parameters. In this example, an "available job" is defined according to the current schedule. A job J is available if it has not been processed yet by the respective node and the jobs preceding J according to any precedence constraints have been completed.

---

Input: Instance I
Output: A configuration $\theta \in \Theta$ of the network
• Move the pointers associated with $c_v(x)$'s to the initial positions (initial nodes)
• For a node v: let $Q_v$ be a queue comprising jobs to be processed by v first; $Q_v$ can be empty e.g. if none of the jobs starts at v
• While there are jobs to be processed:
  • For each node v:
    • Let w be the current node in the cycle $c_v(x)$
    • Pick a most recent one (w.r.t. its arrival time at w) of available jobs J from queue $Q_w$
    • Move the current pointer to the next node in $c_v(x)$
    • Schedule J to be processed as early as possible by v taking into account any scheduling constraints, e.g., the current schedule and availability intervals at v
    • Remove J from $Q_w$
    • If v is not the destination for J, add J to queue $Q_u$; where u is next node in route for J
• Map the obtained schedule to a configuration $\theta$ such that the schedule is reproduced by the network when configuring it with $\theta$, e.g., $\theta$ may describe gate control lists when using time-sensitive networking

---

Typically, for a given data stream between a first and a second device, the scheduling instance defines the route to be followed between the devices. In other words, with respect to the scheduling, the routing mechanism that is used may be a black box. It is also possible to make the routing a part of the scheduling procedure. It is possible to apply the scheduling procedure Sched several times for traffic at respective priority levels, e.g., by first applying the scheduling procedure to higher-priority (e.g., critical) traffic and then to lower-priority (e.g., best-effort) traffic, taking the timeslots occupied by the higher-priority traffic into account as a scheduling constraint.

Figure 4C:
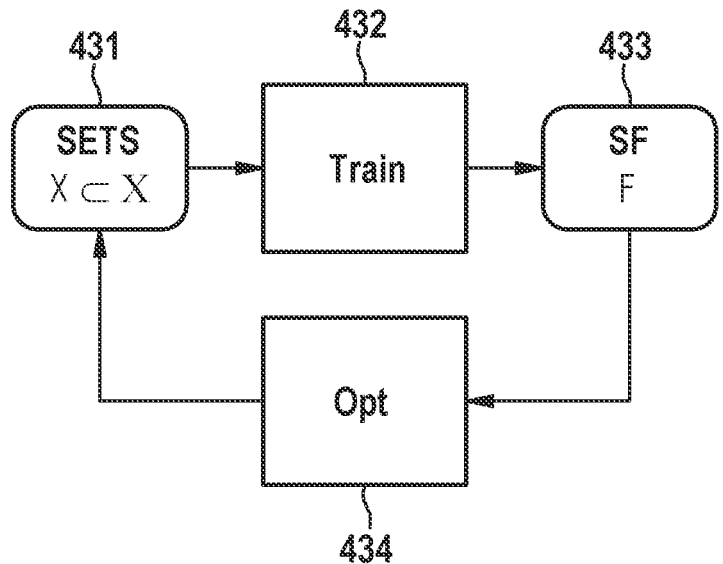
FIG. 4C shows a detailed example of optimizing customization parameters, according to the present invention.

FIG. 4C shows a detailed, yet non-limiting, example of optimizing customization parameters with respect to a performance indicator. The performance indicator may be based on a latency and/or a packet loss, e.g., based on a maximum or average latency.

In general, the optimization of the customization parameters may be phrased as an empirical risk minimization problem that may be addressed by generic optimization techniques. As the inventors realized, customization parameters are in many cases most naturally phrased as discrete, or in particular binary, parameters. In such cases, the optimization of the customization parameters may be performed by a pseudo-Boolean optimization, in other words, as an optimization that minimizes a pseudo-Boolean function.

A particularly effective way of performing this optimization is illustrated in the figure. In this example, the optimization is performed by iteratively training Train, 432 a scoring function SF, 433 to score candidate sets of customization parameters according to the performance indicator that is to be optimized. Specifically, the scoring function may be classifier, in which the candidate sets SETS may be partitioned into "good" and "bad" ones according to the performance indicator g, e.g., by thresholding. Then, a classifier (e.g., F and d in the example below) may be trained to separate "good" sets from the "bad" ones. A continuous-valued scoring function is also possible.

Having trained the scoring function SF, an optimization Opt, 434, with respect to the scoring function may be performed to determine a further set of customization parameters, which may be added to a set of candidate sets SET, 431. For example, the further set may be generated such that it is classified as "good", or receives a good score, by the current scoring function SF. It is noted that having received a good score may not guarantee that the further set scores well in terms of the performance indicator. This is not a problem for the proposed techniques because, in such a case, this further set may be used as a "bad" candidate set in the next iteration. It will be understood that the optimization may be heuristic and/or arrive at a local optimum.

When a certain stopping criterion (e.g., a maximum number of iterations, and/or a maximum quality improvement of the current best solution) is met, the optimization may return the current best solution.

Below, a detailed example of the optimization discussed above is provided. In this example, the set of customization parameters is a set of binary values. E.g., the set of possible customization parameters $\mathcal{X}$ may be a subset of $\{0,1\}^n$ for an integer n. The optimization problem may be implemented as a minimization of a pseudo-Boolean function, for example, as follows:

---

Input: Performance indicator (evaluation function) g, $X_0 \subset \mathcal{X}$.
Hyper-parameters: $\lambda \in (0,1)$ .
Output: $x \in \mathcal{X}$
• $X := X^0$.
• While the number of iterations does not exceed a given limit:

• $\xi := \lambda \cdot \min_{x \in X} g(x) + (1 - \lambda) \cdot \max_{x \in X} g(x)$.

• Partition X into $X^-$ and $X^+$ such that $g(x) < \xi$ for all $x \in X^+$ and $g(x) \geq \xi$ for all $x \in X^-$
• Construct $F: \{0,1\}^n \to \mathbb{R}^m$ and $d \in \mathbb{R}^m$ such that $F(x) \leq d$ for all $x \in X^-$ and $F(x) \leq d$ for no $x \in X^+$ .
• Pick $i \in [m]$ at random and find an optimal solution $x_i$ of $$\max_{x \in X} F_i(x).$$

-continued

- Update the current best solution if $x^i$ is better.
- $X := X \cup \{x_i\}$.
- Optionally: remove all $x \in X$ such that $F(x) < d$
- Return the current best solution x.

While not needed in general, in the above example, F is constructed as a classifier that perfectly splits the training data. This classifier may for example be a polyhedral classifier. Such a classifier may comprise a number m of hyperplanes in a Hilbert space H. The classifier may be trained by providing at least one training dataset of at least one pair of a numerical vector $e \in E \subset D$ in an instance space D and an associated label. The label may take one of two different label values L0, L1, respectively. The training may comprise mapping the one or more numerical vectors e of the training data set to points of a unit sphere $S \subset H$ in the Hilbert space H according to a predetermined mapping $\tau \circ \kappa : D \to H$, where the unit sphere S is defined according to a norm $\|\cdot\|_H$ (Hilbert norm), which is derived from an inner product $<.,.>_H$ of the Hilbert space H. The classifier may be trained based on the numerical vectors e of the training data set. The training may comprise determining the number m of hyperplanes, and determining the hyperplanes, such that numerical vectors $e \in E^- \subset E$ of the training data mapped to the unit sphere S with a zero-label value L0 each lie on a side of at least one of the hyperplanes. Such a classifier is described, for example, in German Patent Application No. DE 10 2020 213 253 A1 (incorporated herein by reference). Using such a type of classifier, the function F of the above algorithm may be defined as follows:

Procedure for constructing F:
- Run the binary classifier to find $H \in \mathbb{R}^{m \times n}$ and $d \in \mathbb{R}^m$ such that
  $Hx \le d$ for all $x \in X^-$ and
  $Hx \le d$ for no $x \in X^+$.
- Define F as $F(x) = Hx$.
- Return F and d.

Effectively, the step of constructing F may correspond to learning an upper level set $\{x \in \mathcal{X} : g(x) \ge \xi\}$ of the performance indicator g based on the current sample SETS, $X \subset \mathcal{X}$. It is noted that the above technique can be applied to any set of customization parameters represented as binary values.

Figure 4D:
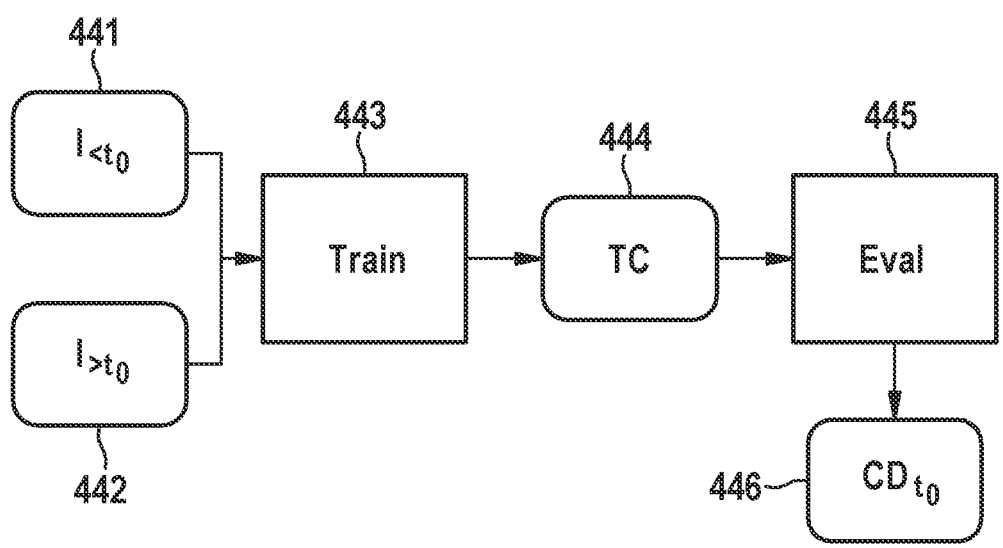
FIG. 4D shows a detailed example of change point detection, according to the present invention.

FIG. 4D shows a detailed, yet non-limiting, example of change point detection. The change point detection may be applied to previously obtained scheduling instances to detect a change point in the instances. As also discussed with respect to FIG. 3, the detected change point may be used to select scheduling instances to be used for optimizing the customization parameters, and/or to trigger this optimization.

In the example illustrated here, the change point detection procedure may be performed by training Train, 443 a classifier to distinguish between a set of scheduling instances I<t0, 441 before a candidate change point $t_0$, and a set of scheduling instances I>t0, 442, after the change point. In particular, the classifier may act on the values of one or more performance indicators for the scheduling instances. The performance indicator(s) used may be the same as used to optimize the customization parameters, but interestingly, it is also possible to use more, or in any case partly different, performance indicators to detect a wider range of changes to the network configuration. The training may result in a trained classifier TC, 444.

By evaluating Eval, 445, performance of the trained classifier TC, for example by applying the trained classifier to a number of scheduling instances not used as input to the training Train, a change point detection output CDt0, 446, for the candidate change point $t_0$ may be determined. By using change point detection instead of for example monitoring the performance indicator of scheduling instances, a wider range of changes to the network environment can be detected.

The number of previous scheduling instances on which the change point detection is trained can for example be at most or at least 40, at most or at least 60, or at most or at least 100 scheduling instances. While increasing the number of instances may improve the accuracy of the change point detection, it may also cause a slower reaction to changes. Interestingly, it was found that using around 50 scheduling instances in many cases already provides a sufficiently accurate change point detection.

In principle, any kind of classifier can be used with the change point detection, but the inventors obtained particularly good results with a polyhedral classifier, as also discussed with respect to FIG. 4C and described in German Patent Application No. DE 10 2020 213 253 A1 (incorporated herein by reference). As the inventors found, the polyhedral classifier has a sufficiently small running time for real-time application while also having a sufficiently good prediction accuracy for the present application.

As a detailed example, the following change point detection procedure may be used:

- For each time window $W = \{t_1, ..., t_2\}$ comprising a given number of intervals, and a given $\Delta$ smaller than $|W| = 4$:
  - Let $t_0 = [(t_2 - t_1)/2]$
  - For each interval $t \ge t_1 + \Delta - 1$ in W, compute the vector of average packet latencies, or any other performance indicator (s), corresponding to all schedules reproduced by configurations $\theta_\tau$, $\tau \in \{t - \Delta + 1, t\}$
  - Sample a given number of vectors from the obtained set and label them according to $t_0$: if the respective interval t was no later than $t_0$; assign one label (e.g., −1); otherwise assign another label (e.g., 1)
  - Construct a classifier representing the obtained training data, e.g., a polyhedral classifier
  - For the remaining intervals in W; apply the classifier in order to predict whether the respective interval was no later than $t_0$
  - Compare the predictions with the ground truth. If the error rate was less than a given threshold (e.g., 0.1), return that a change point at $t_0$ has been detected; else return that no change point has been detected.

Figure 5A:
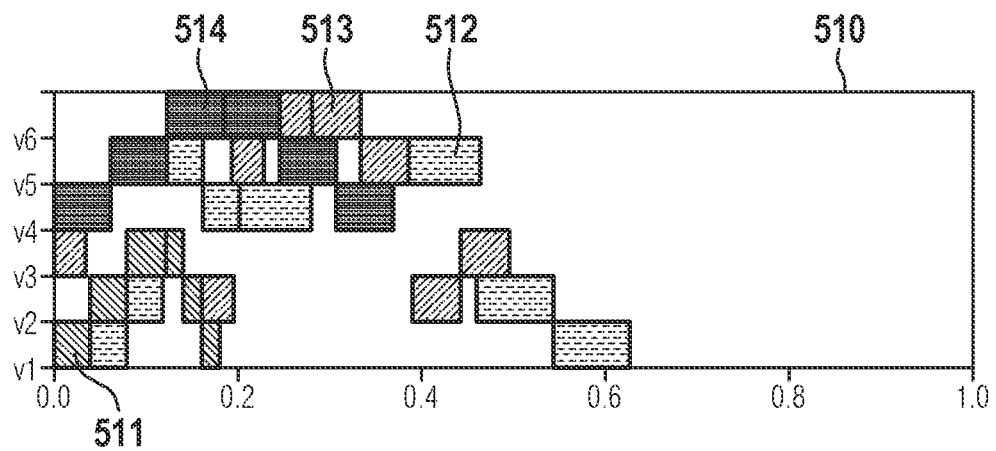
FIG. 5A shows a detailed example of a schedule for data transmissions, according to the present invention.

FIG. 5A shows a detailed, yet non-limiting, example of a schedule 510 for data transmissions, determined using a configuration procedure as described herein.

In this network, the data streams for the six network devices illustrated in FIG. 2 are scheduled. Devices 211-216 are shown on the y-axis of the figure as nodes v1-v6. In this example, for each pair $(a_1, a_2)$ of communicating applications, $a_1$ is scheduled to send a packet to $a_2$, and $a_2$ is scheduled to send a packet back as a response to the packet of $a_1$.

The figure shows, for each device, a time window in which the device may be configured to transmit data according to the respective applications 511-514, corresponding to applications 231-234 of the FIG. 2. Accordingly, for such a data transmission, the sending device may be configured to send the data for that application to the receiving device during that time window, and/or the receiving device may be configured to receive the data for that application from the sending device during that time window. For example, gate control lists for the corresponding devices may be configured accordingly.

As an example, as can be seen in the figure, node v5 may be configured to:
 first transmit data (received from node v4 and sent to node v6) for application 514;
 then to transmit data (received from node v2 and sent to node v4) for application 512;
 then to transmit data (received from node v2 and sent to node v6) for application 513;
 then to transmit data (received from node v5 and sent to node v4) for application 514;
 then to transmit data (received from node v6 and sent to node v2) for application 513; and
 finally to transmit data (received from node v4 and sent to node v2) for application 512.

The time window shown in the figure has a width if 1 millisecond. Accordingly, the resulting schedule may be used as a periodic schedule with cycle time of 1 millisecond. More generally, scheduling parameters may be for a periodic schedule with a period of between 0.1 and 10 ms, in particular between 0.5 and 5 ms.

Figure 5B:
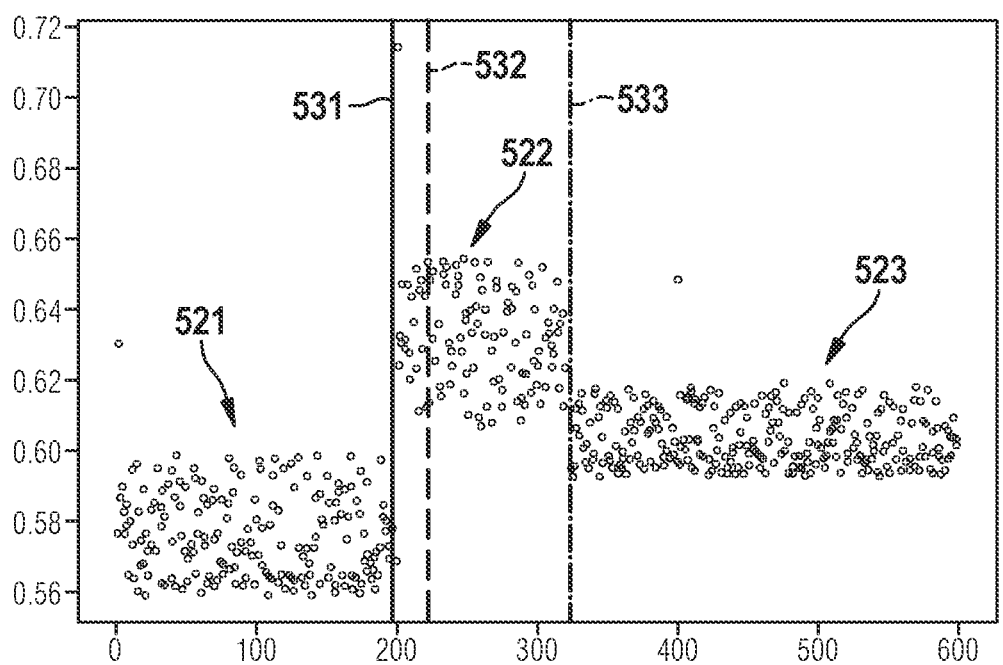
FIG. 5B shows an example of changes in a performance indicator, according to the present invention.

FIG. 5B shows, yet non-limiting, example of changes in a performance indicator of a communication network due to a configuration according to the techniques described herein.

In particular, the figure shows, for a network configured as described herein, an average latency of network traffic scheduled according to determined scheduling parameters, for 600 time windows.

This example corresponds to the example of FIG. 2 and FIG. 5A, where several data streams of the same type are scheduled between the respective pairs of applications. In this example, for application 231 between applications 201 and 204, the packet sizes for the data streams in intervals $t \in \{0, \ldots, 200\}$ until time point 531 are drawn at random from a distribution $D_1$. After time point 531, for $t > 200$, the packet sizes for this application are drawn from another distribution $D_2$. The other data streams, for applications 232-234, are constant for all intervals.

Before time point 533, scheduling parameters are determined according to a first set of customization parameters $x_1$, e.g., the network is configured according to $\theta^t = P(x_1, I_t)$. In this example, a change point detection procedure is used to detect a change point in the scheduling instances. The change point detection procedure in this case correctly identified, at time point 532, time point 531 as a change point. Triggered by the detected change point, an optimization of the customization parameters is performed using 10 scheduling instances after time point 531. From time point 533, the updated customization parameters $x_2$ are used to configure the network, in this case, by determining scheduling parameters both according to the updated customization parameters $x_2$ and according to the previous customization parameters $x_1$. That is, the network receives configurations $\theta^t = P(\hat{x}, I_t)$, where $\hat{x} = \text{argmin}_{x \in \{x_1, x_2\}} g(x)$ for intervals t after time point 533. The time between time points 532 and 533 thus represents the time needed to perform the optimization to determine the new customization parameters $x_2$. In general, this time depends on the available computational capacities and on the implementation used.

As can be seen in the figure, after time point 533, the average latency 523 is reduced compared to the average latencies 522 before the reconfiguration, although it remains higher than the latency 521 before the change in the network setup.

It is noted that the above experiment does not take into account the time that is needed to reconfigure the network based on the current scheduling instance. In practice, at the beginning of an interval t, some time is needed to apply the configuration procedure to determine $\theta_t$, and to reconfigure the network according to $\theta_t$.

Figure 6:
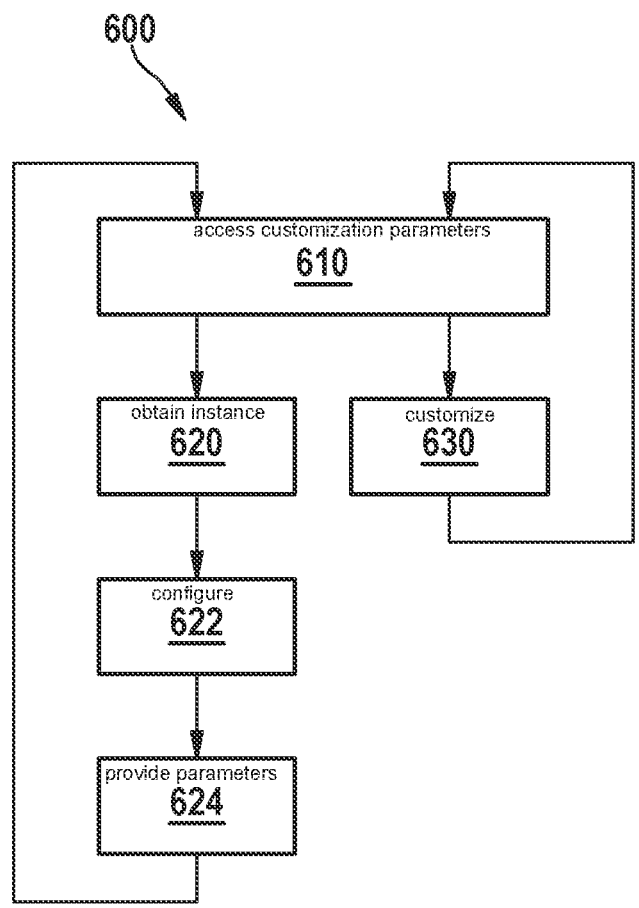
FIG. 6 shows a computer-implemented method of configuring a network, according to an example embodiment of the present invention.

FIG. 6 shows a block-diagram of computer-implemented method 600 of configuring a communication network. The communication network may comprise multiple configurable devices. The respective devices may be configured to communicate according to respective scheduling parameters. The scheduling parameters may indicate a timing of transmitting and/or receiving data over the communication network. The method 600 may correspond to an operation of the system 100 of FIG. 1. However, this is not a limitation, in that the method 600 may also be performed using another system, apparatus or device.

The method 600 may comprise, in an operation titled "ACCESS CUSTOMIZATION PARAMETERS", accessing 610 a set of customization parameters of a configuration procedure. The configuration procedure may be configured to determine the scheduling parameters of the multiple configurable devices for a scheduling instance. The scheduling instance may represent multiple data streams to be scheduled.

The method 600 may comprise, in an operation titled "OBTAIN INSTANCE", obtaining 620 a current scheduling instance. The method 600 may comprise, in an operation titled "CONFIGURE", applying 622 the configuration procedure to the current scheduling instance to determine current scheduling parameters of the multiple configurable devices. The method 600 may comprise, in an operation titled "PROVIDE PARAMS", providing 624 the current scheduling parameters to the respective devices.

The method 600 may comprise, in an operation titled "CUSTOMIZE", based on the current scheduling instance, optimizing 630 the customization parameters of the configuration procedure with respect to a performance indicator of scheduling the current scheduling instance according to the customization parameters.

It will be appreciated that, in general, the operations of method 600 of FIG. 6 may be performed in any suitable order, e.g., consecutively, simultaneously, or a combination thereof, subject to, where applicable, a particular order being necessitated, e.g., by input/output relations. In particular, as illustrated in the figure operations 620-624 may be performed based on a current set of customization parameters while, at the same time, operation 630 is performed to determine an updated set of customization parameters to be used in subsequent executions of operations 620-624.

Figure 7:
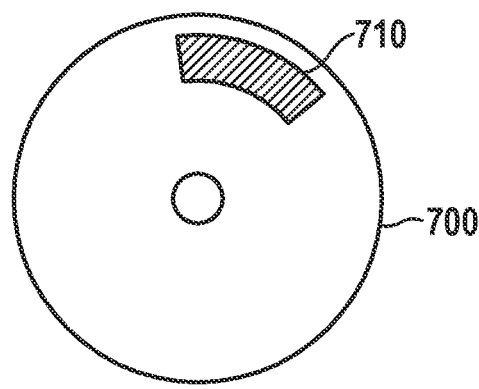
FIG. 7 shows a computer-readable medium comprising data, according to an example embodiment of the present invention.

The method(s) may be implemented on a computer as a computer implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The medium 700 may be transitory or non-transitory. Examples of computer readable mediums include memory devices, optical storage devices, integrated circuits, servers, online software, etc. FIG. 7 shows an optical disc 700. Alternatively, the computer readable medium 700 may comprise data 710 representing a set of customization parameters of a configuration procedure for configuring a communication network comprising multiple configurable devices as described herein.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Reference signs placed between parentheses shall not be construed as limiting the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device described as including several means, several of these means may be embodied by one and the same item of hardware. The mere fact that certain measures are described separately does not indicate that a combination of these measures cannot be used to advantage.

What is claimed is:

1. A computer-implemented method of configuring a communication network, the communication network including multiple configurable devices, wherein respective devices of the configurable devices are configured to communicate according to respective scheduling parameters, wherein the scheduling parameters indicate a timing of transmitting and/or receiving data over the communication network, the method comprising the following steps:
   accessing a set of customization parameters of a configuration procedure, wherein the configuration procedure is configured and customised by the set of customization parameters to heuristically determine the scheduling parameters of the multiple configurable devices for a scheduling instance and without optimizing the scheduling parameters with respect to a performance indicator, wherein the scheduling instance represents multiple data streams to be scheduled;
   obtaining a current scheduling instance;
   applying the configuration procedure to the current scheduling instance to determine current scheduling parameters of the multiple configurable devices;
   providing the current scheduling parameters to the respective devices; and
   optimizing, based on the current scheduling instance, the customization parameters of the configuration procedure with respect to the performance indicator of scheduling the current scheduling instance according to the customization parameters to obtain a set of optimized customization parameters for determining scheduling parameters for one or more later-obtained scheduling instances,
   wherein the optimizing includes:
      in each of a plurality of iterations, training a scoring function to score candidate sets of customization parameters with respect to the performance indicator, and performing, in each of the iterations, an optimization with respect to the scoring function to determine, using the trained scoring function, a respective further set of customization parameters to add to the candidate sets of customization parameters,
      after performing the plurality of iterations, providing a best set of customization parameters from the candidate sets of customization parameters, as the set of optimized customization parameters for determining the scheduling parameters.

2. The method of claim 1, wherein the applying of the configuration procedure includes applying a job scheduling algorithm to obtain a schedule for respective data transmissions corresponding to the multiple data streams, and deriving the scheduling parameters from the schedule.

3. The method of claim 2, wherein the applying of the job scheduling algorithm includes scheduling a data transmission from a first device to a current second device, and selecting a next second device for data transmission from the first device according to an ordering defined by the customization parameters.

4. The method of claim 3, further comprising:
   queueing a data transmission from the current second device to a next device on a route indicated by the corresponding data stream.

5. The method of claim 1, further comprising:
   optimizing the customization parameters by empirical risk optimization over one or more scheduling instances.

6. The method of claim 5, wherein the customization parameters are binary values and the customization parameters are optimized by pseudo-Boolean optimization.

7. The method of claim 6, wherein the optimization comprises iteratively: training a scoring function to score candidate sets of customization parameters according to the performance indicator, and determining a further set of customization parameters by optimizing with respect to the trained scoring function.

8. The method of claim 1, further comprising:
   accessing multiple respective sets of customization parameters;
   determining respective scheduling parameters according to the respective sets of customization parameters; and
   selecting the current scheduling parameters from the respective scheduling parameters based on the performance indicator for the current scheduling instance.

9. The method of claim 1, further comprising:
   applying a change point detection procedure to detect a change point of scheduling instances, and selecting scheduling instances for the optimization based on the detected change point.

10. The method of claim 9, wherein the applying of the change point detection procedure includes training a polyhedral classifier to distinguish between scheduling instances before and after the change point, and evaluating a performance of the trained classifier.

11. The method of claim 9, wherein the optimization is performed in response to a detected change point.

12. The method of claim 1, wherein the scheduling parameters represent a gate control list and/or data transmission timings for time-sensitive networking.

13. The method of claim 1, wherein the scoring function is a classifier.

14. A system for configuring a communication network, the communication network including multiple configurable devices, wherein respective devices of the multiple configurable devices are configured to communicate according to respective scheduling parameters, wherein the scheduling parameters indicate a timing of transmitting and/or receiving data over the communication network, wherein the system comprises:
  a data interface configured to access a set of customization parameters of a configuration procedure, wherein the configuration procedure is configured and customised by the set of customization parameters to heuristically determine the scheduling parameters of the multiple configurable devices for a scheduling instance and without optimizing the scheduling parameters with respect to a performance indicator, wherein the scheduling instance represents multiple data streams to be scheduled;
  a processor subsystem configured to:
    obtain a current scheduling instance,
    apply the configuration procedure to the current scheduling instance to determine current scheduling parameters of the multiple configurable devices,
    provide the current scheduling parameters to the respective devices, and
    optimize, based on the current scheduling instance the customization parameters of the configuration procedure with respect to the performance indicator of scheduling the current scheduling instance according to customization parameters to obtain a set of optimized parameters for determining scheduling parameters for one or more later-obtained scheduling instances,
    wherein the optimizing includes:
      in each of a plurality of iterations, training a scoring function to score candidate sets of customization parameters with respect to the performance indicator, and performing, in each of the iterations, an optimization with respect to the scoring function to determine, using the trained scoring function, a respective further set of customization parameters to add to the candidate sets of customization parameters,
      after performing the plurality of iterations, providing a best set of customization parameters from the candidate sets of customization parameters, as the set of optimized customization parameters for determining the scheduling parameters.

15. The system of claim 14, wherein the system is a central network controller of a communication network, and wherein the scheduling parameters are for time-sensitive networking.

16. A non-transitory computer-readable medium on which are stored data representing instructions configuring a communication network, the communication network including multiple configurable devices, wherein respective devices of the configurable devices are configured to communicate according to respective scheduling parameters, wherein the scheduling parameters indicate a timing of transmitting and/or receiving data over the communication network, the instructions, when executed by a processor system, causing the processor system to perform the following steps:
  accessing a set of customization parameters of a configuration procedure, wherein the configuration procedure is configured and customised by the set of customization parameters to heuristically determine the scheduling parameters of the multiple configurable devices for a scheduling instance and without optimizing the scheduling parameters with respect to a performance indicator, wherein the scheduling instance represents multiple data streams to be scheduled;
  obtaining a current scheduling instance;
  applying the configuration procedure to the current scheduling instance to determine current scheduling parameters of the multiple configurable devices;
  providing the current scheduling parameters to the respective devices; and
  optimizing, based on the current scheduling instance, the customization parameters of the configuration procedure with respect to the performance indicator of scheduling the current scheduling instance according to the customization parameters to obtain a set of optimized customization parameters for determining scheduling parameters for one or more later-obtained scheduling instances,
  wherein the optimizing includes:
    in each of a plurality of iterations, training a scoring function to score candidate sets of customization parameters with respect to the performance indicator, and performing, in each of the iterations, an optimization with respect to the scoring function to determine, using the trained scoring function, a respective further set of customization parameters to add to the candidate sets of customization parameters,
    after performing the plurality of iterations, providing a best set of customization parameters from the candidate sets of customization parameters, as the set of optimized customization parameters for determining the scheduling parameters.

* * * * *